United States Patent [19]

Baker et al.

[11] Patent Number: 4,554,639
[45] Date of Patent: Nov. 19, 1985

[54] AUDIO DOSIMETER

[75] Inventors: William B. Baker, Newark, Del.; Harry E. Betsill, Timonium, Md.

[73] Assignee: E. I. Du Pont de Nemours and Company, Wilmington, Del.

[21] Appl. No.: 482,594

[22] Filed: Apr. 6, 1983

[51] Int. Cl.$^4$ .......................... G01H 3/12; G08B 21/00
[52] U.S. Cl. ........................................ 364/556; 73/647
[58] Field of Search ....................... 364/556, 557, 571; 73/648, 645, 646, 632, 647; 179/1.1

[56] References Cited

U.S. PATENT DOCUMENTS

| B 523,080 | 2/1976 | Haig-Arbib | 73/557 |
| 3,681,618 | 8/1972 | Blackmar | 307/229 |
| 3,868,857 | 3/1975 | Maddox et al. | 73/558 |
| 3,968,697 | 7/1976 | Mutziger | 73/647 |
| 4,020,286 | 4/1977 | Ceci | 179/1.5 A |
| 4,100,810 | 7/1978 | Sima | 73/647 |
| 4,257,273 | 3/1981 | Knowd | 73/647 |
| 4,277,980 | 7/1981 | Coats et al. | 73/646 |
| 4,307,385 | 12/1981 | Evans et al. | 73/647 X |

OTHER PUBLICATIONS

Model 4341 Low Cost True RMS-to -DC Converter, Jan. 1975, 4 pages, Burr-Brown Publication.
Industrial Hygiene New, May 1982, p. 57.
Integrated Circuit True RMS-to-DC Converter, 5 pages, Analog Device Publication.
LH0091 True RMS-to-DC Converter, Aug. 1976, 7 pages, National Semiconductor Publication.

Primary Examiner—Edward J. Wise
Attorney, Agent, or Firm—Hilmar L. Fricke

[57] ABSTRACT

An audio dosimeter for use by an individual for measuring exposure to sound which contains the following components:
(a) an electronic microphonic sound sensor means,
(b) an amplifier and weighting circuit,
(c) an x-squared detector circuit,
(d) a temperature compensation circuit;
(e) analog to digital time converter,
(f) a microcomputer which controls functions of the temperature compensator circuit and analog to digital time converter and has unique logarithmic mathematics for converting the signal from the converter into sound measurement values such as percent of dose, average and maximum decibel levels and instantaneous sound level.

10 Claims, 6 Drawing Figures

AUDIO DOSIMETER

BACKGROUND OF THE INVENTION

This invention is related to a device which measures noise to which an individual is exposed.

In a work environment, the accumulated amount of noise or dose, the average noise level and the maximum level of noise to which an individual has been exposed during a work day are important to occupational safety and health of an individual. Currently, industry and governmental agencies such as Occupational Safety and Health Administration (OSHA), Mine Safety and Health Administration (MSHA) and the Department of Defense (DOD) require accurate measurements and noise data measurements such as the percent of total daily dose allowable for an individual, the average and maximum noise levels of exposure and constant sound level monitoring.

Audio dosimeters are known in the art as shown in Maddox et al. U.S. Pat. No. 3,868,857 issued Mar. 4, 1975, Ceci U.S. Pat. No. 4,020,286 issued Apr. 26, 1977 and Sima, Jr., et al., U.S. Pat. No. 4,100,810 issued July 18, 1978. Generally, these dosimeters are not as accurate as is required and only provide dose values and are not sufficiently versatile to provide the aforementioned noise data measurements which are currently required.

The audio dosimeter of this invention is a compact and accurate instrument that provides the above data which can be visually displayed or can be fed directly into a computer and recorded to provide accurate records for an individual.

SUMMARY OF THE INVENTION

An audio dosimeter for use by an individual for measuring exposure to sound which contains the following components:

(a) an electrical microphonic sound sensor means which generates an electric input signal upon activation by sound;

(b) an amplifier and weighting circuit electrically connected to the sound sensor means which amplifies the input signal from the sound sensor means and provides an "A" weighted signal directly related to the frequency of the sound which activated the sound sensor;

(c) an x-squared detector circuit electrically connected to the amplifier and weighting circuit which receives the input signal and generates a voltage signal which is proportional to the log of the square of the input signal;

(d) temperature compensation circuit electrically connected to the x-squared detector circuit which develops reference signals through ramping and integrating means matched to the x-squared detector circuit and thus temperature compensates the voltage signal of the x-squared detector circuit;

(e) analog to digital time converter electrically attached to the temperature compensation circuit which converts the temperature compensated voltage signal to digital time signal;

(f) a microcomputer electrically connected to the temperature compensation circuit and controls the integrating and ramping functions of the circuit and electrically connected to the analog to digital time converter and controls the functions of the converter and receives the digital time signals from the converter and having unique logarithmic mathematics to convert the digital time signals into readings such as percent of dose, average and maximum decibel levels and instantaneous sound level.

DETAILED DESCRIPTION OF THE INVENTION

The audio dosimeter is designed for use by an individual in a work environment and can be carried by a belt or pocket clip. The size of the dosimeter is about 12 cm. wide × 17.8 cm. long × 2.8 cm. deep and weights about 250 g. A microphone is clipped to a person's shirt or coat pocket or collar or on a tab near the ear. The dosimeter need not be worn but may be placed in a work area where noise is monitored.

Typically, the dosimeter is used to monitor the level of noise a worker is exposed to during an 8-hour work period. An audio dosimeter is issued to a worker with all readings at zero. At the end of the work period, readings can be manually read from the display of the dosimeter or the dosimeter can be plugged into a computer and the information directly fed into the computer. Typical items that are monitored and recorded by the audio dosimeter are as follows:

Dose in percent of total allowable dose,

Average (numerical) dB (decibel) of exposure known as LAVG and

Maximum dB level of exposure known as LMAX, and

Total time of exposure.

The dosimeter also monitors instantaneous sound pressure levels known as SPL with the display being updated once per second.

The specification requirements and the essential functions of an audio dosimeter are specified by the American National Standard Institute Society document ANSI S1.25—1978 which document is hereby incorporated by reference.

The dosimeter meets the specification requirements of ANSI S1.25—1978 and has an operating range of 80–148 dB, criterion levels of 80, 84, 85 and 90 dB, threshold levels of 0, 80, 85 and 90 dB, exchange rate 3, 4, 5, and 6 dB and has a liquid crystal display which shows dose 0 to 1999%, average dB level of 77–141 dB, maximum dB level of 77–141 dB, time up to 19 hours 59 minutes, and instantaneous sound, i.e., sound level meter within range of 50–141 dB.

Figure 1:
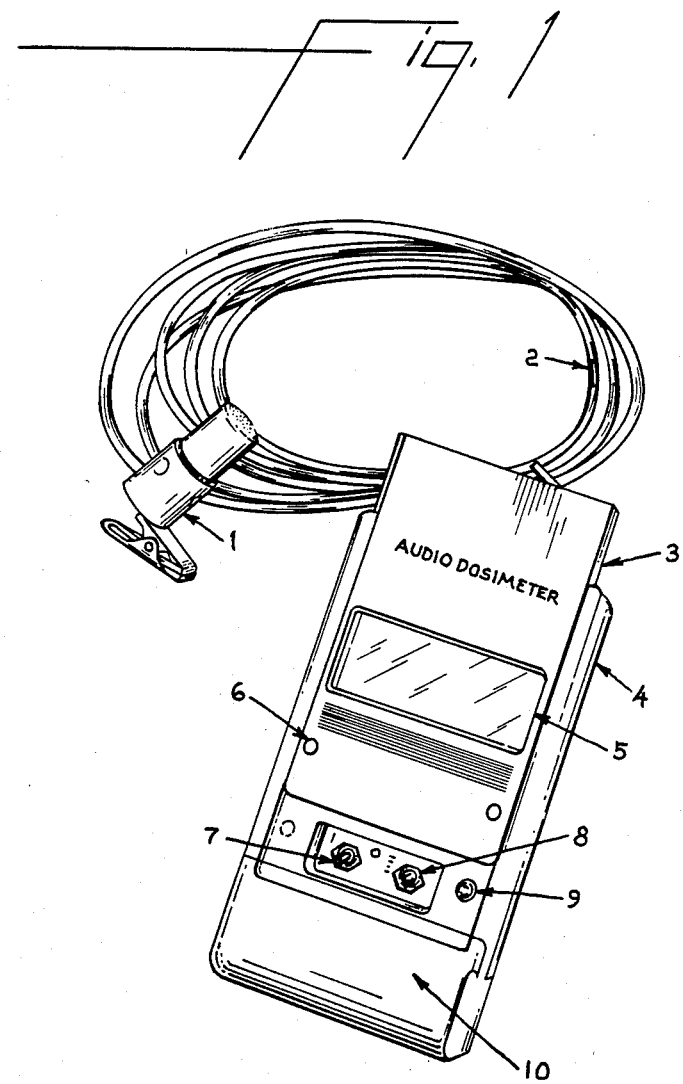
FIG. 1 shows a sketch of the audio dosimeter.

FIG. 1 shows a sketch of the audio dosimeter. A microphone 1, typically a 1.2 SCM ceramic type microphone Knowles BL 1830, is attached to a long cable 2 which is attached to the circuitry in the case 4 of the dosimeter and held in place in the case 4 by a large rubber grommet (not shown). A protective cover 3 shown in the open position slides in slots in the case and protects switch 7 from damage and can be locked into place with a set screw. The cover 3 has a viewing window 5 and when the cover 3 is closed a display not shown in the sketch is visible. When the switch 7 is engaged, light emitting diode 6 flashes to indicate the batteries are operative. A push button switch 8 selects the desired display, i.e., % dose, average decibel level, maximum decibel level and the like. A set screw 9 locks the cover when the dosimeter is in use in a closed position to protect the switches from damage. A battery cover 10 can readily be removed to insert new batteries. Typically, 9-volt alkaline is used.

Figure 2:
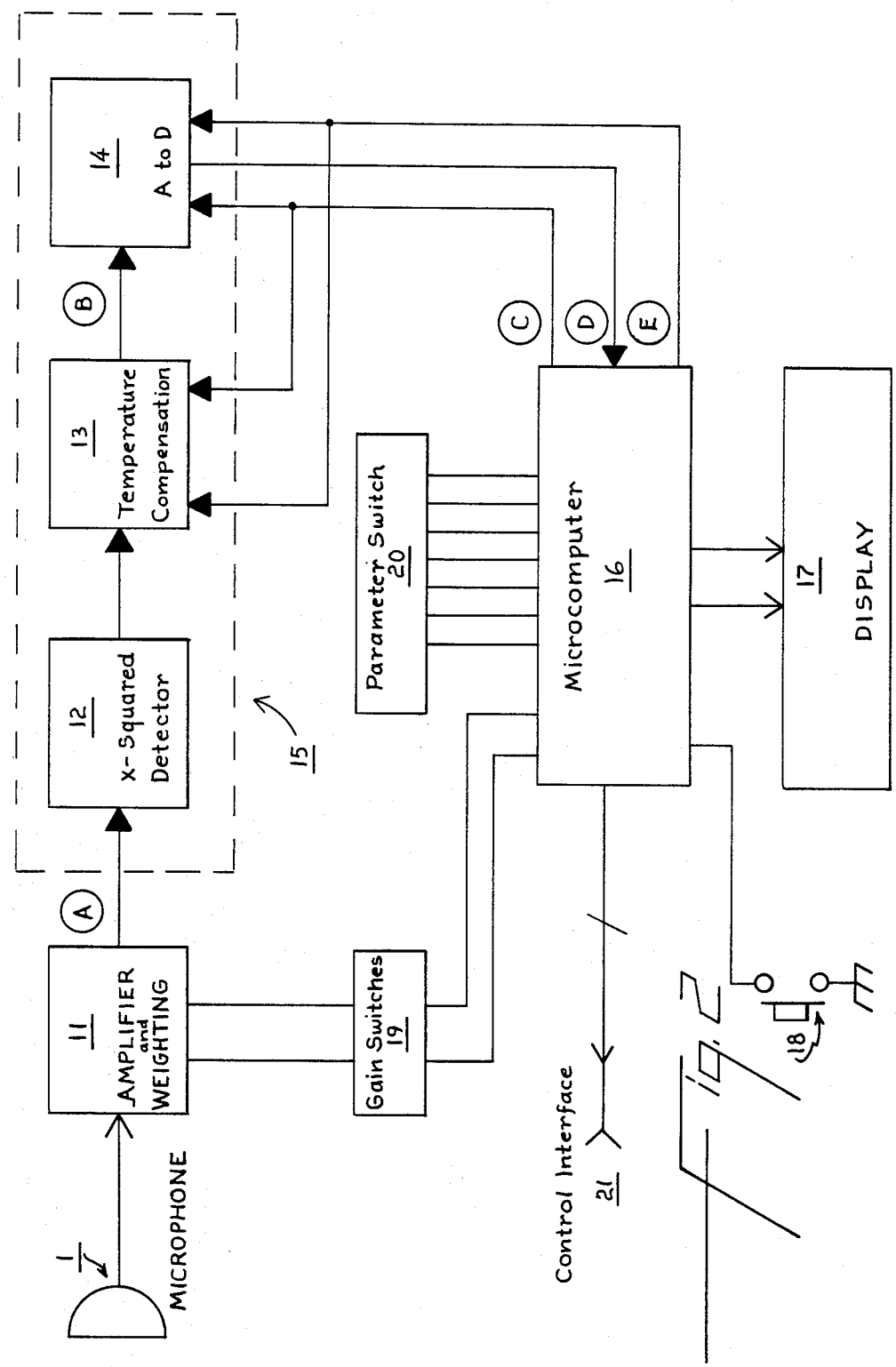
FIG. 2 shows a block diagram of the electrical components of the audio dosimeter.

FIG. 2 shows a block diagram of the electrical components used in the audio dosimeter. The microphone 1 picks up a sound and converts the sound into an electrical signal which is fed into the amplifier and weighting circuit 11. The circuit is constructed from three operational amplifiers; the first and second configured as noninverting, selectable gain (0 and 20 dB) stages and the third as an inverting amplifier with adjustable gain to match varying microphone sensitivities. Typically, three stages of a TL 064A quad operational amplifier are used.

The amplifier and weighting circuit 11 matches the impedance of the microphone 1 and amplifies the signal from the microphone 1 and using common filter circuits provides an "A" weighted frequency response in relationship to the input frequency of the signal as defined in Table 1 of the aforementioned ANSI publication.

The resulting input signal A then is fed into x-squared detector circuit 12. In the x-squared detector circuit the input signal is converted to a bilateral current signal which develops a voltage signal which is proportional to two times the log of the input signal. This voltage signal is fed to a bilateral antilogging circuit and then feeds into a parallel combination of an integrating capacitor and a constant current source which produces a detected sound signal voltage which is proportional to the log of the square of the input signal.

The resulting detected sound signal is fed into a temperature compensation circuit. Since the logging and antilogging circuits used in the x-squared detector are inherently temperature sensitive, compensation is required for precision performance. The temperature compensation circuit containing ramping and integrating means which are controlled by the microcomputer 16 temperature compensates the voltage signal from the x-squared detector. The resulting signal B is then fed into the A to D analog to digital time signal convert circuit 14 which converts the temperature compensated voltage signal, B, to digital time signal.

The following describes the combined functions of the temperature compensation circuit 13 and the A to D circuit 14. Reference voltage signals are developed using a logging voltage to current converter and a first antilogging converter feeding a constant current source thereby generating a low reference signal. A second antilogging converter feeding a capacitor and constant current source connected in parallel thereby generating a ramping reference signal. Both signals have the same temperature characteristics as the detected sound signal thus compensating for any circuit temperature affects. Also, the circuit can produce a momentary high reference signal across the capacitor when directed by the computer to start the ramping reference signal ramping down. The low reference signal and ramping reference signals are fed to a first comparator to detect end-of-ramp. The detected sound signal and ramping reference signal are fed to a second comparator to determine when the signals are equal; i.e., when the ramp signal intersects the detected signal. Either comparator signal combined with a logic circuit will pull down the computer interrupt line. An output from the computer to the logic will suppress the interrupt signal only if a ramp crossing caused the interrupt. Thus the computer which controls start-of-ramp and senses end-of-ramp and ramp crossing can by ratioing the two time intervals detect sound pressure level in dB.

The above components 12, 13 and 14, shown within dashed line in FIG. 2 and indicated as 15, are a semicustom integrated circuit developed specifically for the audio dosimeter circuit.

The resulting digital signal from A to D 14 (shown in FIG. 2 as signal D) is fed into the microcomputer 16. The microcomputer 16 through signals C and E controls the functions of the temperature compensation circuit 13 and A to D circuit 14.

The digital signal D is processed by the microcomputer 16. Typically, the microcomputer 16 establishes a 1/16 second sample time base. Within each sample time, digital signal D is used by the microcomputer 16 to perform a nonlinear numerical integration. The integration for each sample time is summed and calculations for all functions measured are made and stored i.e., calculations for % dose, total time of exposure, average and maximum decibel level and instantaneous sound level in decibels. Switch 18 controls the output of these values to the liquid crystal display 17. Engagement of switch 18 causes the microcomputer 16 select the function to be displayed and sends the value to the display 17 the function being shown and the value of that function. A standby position is also included which suppresses accumulation of new data but maintains the data in microcomputer 16.

Gain switches 19 are two miniature sets of switches which allow changing the gain range of the amplifier and weighting circuit 11. These switches allow the selection of two 20 dB gain steps and provides inputs to the microcomputer 16 indicating the gain of the audio range and increases the useful audio range of the dosimeter. By selecting the correct gain switch, the dosimeter can read noise levels of as low as 50 dB when used as a sound level meter.

Parameter switch 20 is electrically connected to the microcomputer 16 and tells the microcomputer the desired doubling rate such as 3, 4, 5, and 6 dB), the aforementioned four criterion levels, and threshold levels to be used in dose calculations.

Optionally, an external data and control interface 21 may be attached to the computer 16 for logging of data and test control of the unit. All parameters fed to the display 17 as well as status information of the state of the battery and switches 19 and 20 may be output of the interface.

Figure 3:
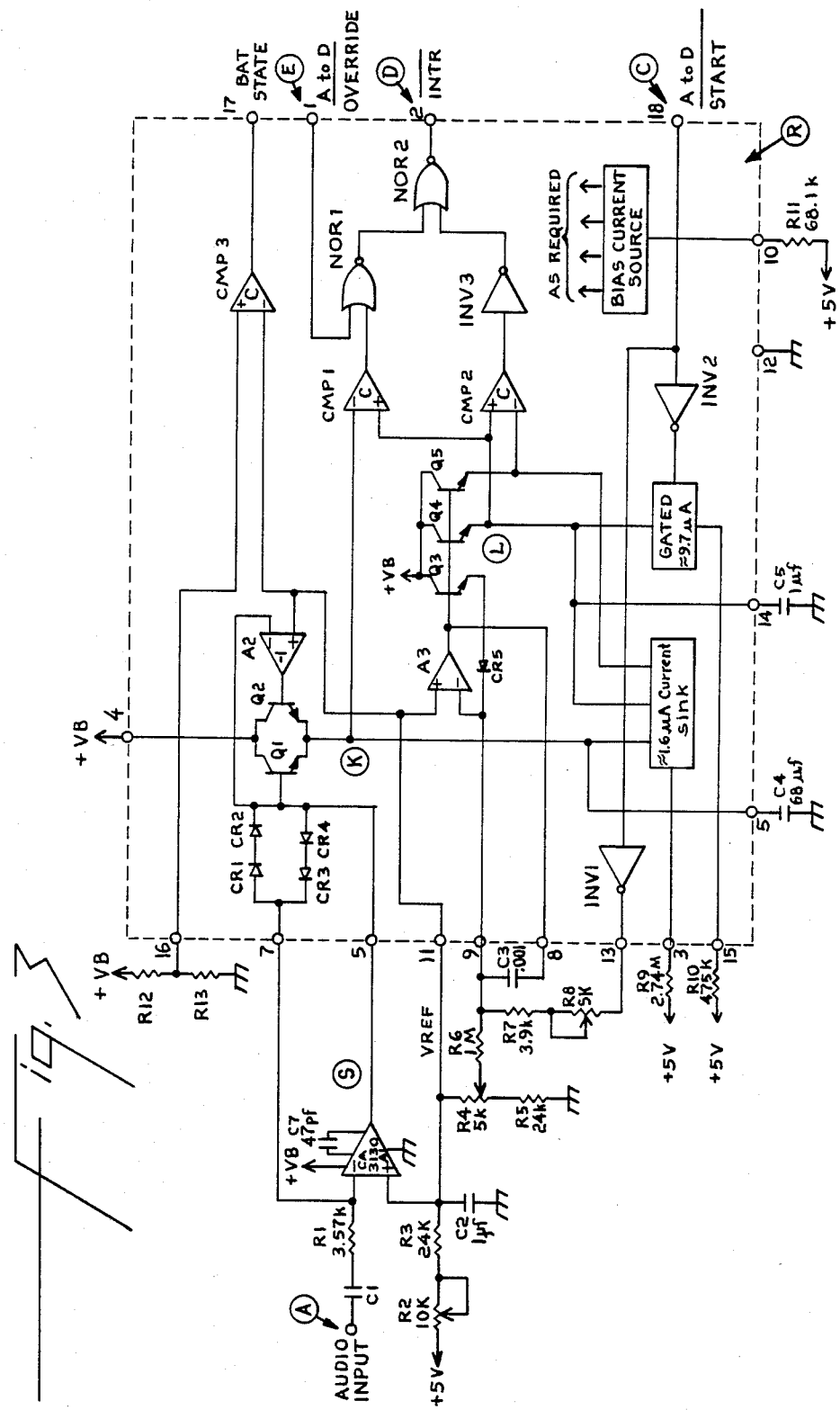
FIG. 3 shows a functional schematic diagram of the x-squared detector, temperature compensation circuit and the analog to digital time converter circuit used in the audo dosimeter.

FIG. 3 shows a functional schematic diagram of the x-squared detector, temperature compensation, and the A to D circuits. The circuitry, Ⓡ, inside the dashed line represents a semi-custom integrated circuit chip developed specifically for the audio dosimeter (identified as 15 on FIG. 2).

The custom integrated circuit chip is constructed from a Monochip H which is a standard chip made by the Interdesign Corporation Sunnyvale, Calif. The custom chip is prepared according to the functional schematic of FIG. 3. The various electrical components shown in FIG. 3 are formed by connected components on the Monochip which is a technique well known to those skilled in the art of making integrated circuits from standard chips.

The audio output voltage A from the amplifier and weighting circuit is driven through C1 typically a 2.2 μF (microfarad) and R1 typically as 3.57 kΩ (kilohm) resistor, to the input of operational amplifier A1, typically a CA 3130, which is configured as a voltage to current converter. Capacitor C7, typically a 47 pF (picofarad) capacitor, is connected to the amplifier A1 to provide phase compensation. The amplifier A1 is connected to $+V_B$ which is the positive side of 9 volt battery used as a power source. The voltage at S is proportional to the log of the square of the signal at A since the current drawn through R1 also flows through two diodes, either CR1 and CR2 or CR3 and CR4 to develop the voltage at S. On the positive half cycle at S transistor Q1, charges C4, typically a 68 μF (microfarad) capacitor and on the negative half cycle the signal is inverted to charge C4 through Q2. A constant current sink of 1.6 μA, (microamps) as set by R9, typically a 2.74MΩ resistor, in conjunction with C4 establishes the one second integration as defined by $$\tau = k\ T\ C/q\ I = 1\ \text{second} \qquad (\text{Eq. 1})$$

where K=Boltzman's constant, $1.3807 \times 10^{-23}$ Joules/Kelvin; T=temperature in Kelvin; C=capacitance, μF; $q=1.6022 \times 10^{-19}$ coulombs, and I=current in mA. Under steady state input conditions the average current supplied by Q1 and Q2 must be equal to the value established by the constant current sink. For a time varying input signal the current to C4 is given by $$I = \frac{1}{I_k}\left(\frac{V_A}{R1}\right)^2 \text{EXP}\left[\frac{q}{kT}(V_{BE} - V_k)\right] \qquad (\text{Eq. 2})$$

where k, T and q are identified above $V_A$ is the voltage at node Ⓐ, $R_1$ is 3.57 kΩ, $V_k$ is voltage at node Ⓚ, $I_k$ is the constant current sink and $V_{BE}$ is the diode voltage associated with $I_k$. This current is integrated to a voltage across C4 which is mathematically equivalent to logging the output of a perfect squaring detector driving a 1 second time constant RC network. The voltage at C4 varies in proportion to the log of the input power.

The resistor network comprising R2, typically 10 kΩ resistor, R3 typically a 24 kΩ resistor, R4 typically 5 kΩ resistor and R5 typically 24 kΩ resistors, develops a voltage $V_{Ref}$ at pin 11 which can be adjusted to be 2.5 V. $V_{Ref}$ is used throughout the x-squared detector and analog to digital converter (A to D) as a common bias voltage. Capacitor C2, typically a 1.0 μF capacitor, bypasses $V_{Ref}$ to provide a low impedance reference in the audio frequency range.

The analog to digital converter (A to D) circuitry provides the means of relating the input signal level to the operating range of the device as well as temperature compensating the x-squared detector and one second time constant integrator. Amplifier A3, transistor Q3 and diode CR5, generate an upper and lower reference voltage in a circuit configuration which is a unilateral equivalent of the x-squared detector. To select the upper limit the microcomputer asserts A to D START at Ⓒ pin 18 of the chip. This forces an open collector inverter, INV1 to ground pin 13 and establishes the upper limit reference current through resistor R7, typically a 3.9 kΩ resistor and R8, typically a 5 kΩ variable resistor. Resistor R8 is adjustable to set the upper limit to a specific value. For a typical case the input voltage range is 64 dB with an upper limit such that 141 dBA which produces a 4 volt peak to peak signal at Ⓐ. The RMS input current at Ⓐ for a sine wave of this magnitude is then $$I_A(RMS) = V_p/\sqrt{2}R_1 \qquad (\text{Eq. 3})$$

or 396 μA where $V_p=2$ volt peak and $R_1=3.57$ kΩ. The total current through Q3 and CR5 must be this value to establish a 141 dBA upper limit.

The low limit is selected at Ⓒ when A to D START is forced low by the microcomputer. Under this condition the current through Q3 and CR5 is established by R6 typically in 1 MΩ (megaohm) resistor, and the voltage at the arm of R4. For a 64 dB dynamic range, this bias current must be 250 nA. Resistor R4 is adjustable to allow calibration of the unit. The reference amplifier A3 is compensated by capacitor C3, typically a 0.001 μF capacitor.

The actual reference to the analog to digital (A to D) converter appears at the emitter of Q5 which also drives a second 1.6 μA current source. During the time interval when A to D START is high, Q4 charges the ramp capacitor C5 to the upper limit voltage with the third constant current generator or 1.6 μA as a load. The voltage across C5 is used as the positive reference to two comparators CMP1 and CMP2. The negative inputs of CMP1 and CMP2 are fed from node Ⓚ and the emitter of Q5, respectively.

R11, typically 68.1 kΩ, sets the bias current as required by the operational amplifier and comparators. Comparators CMP3 compares a portion of the battery voltage to $V_{Ref}$ and provides an output to the computer to indicate if the battery has sufficient charge for an additional 8 hours of use. The specific voltage level, determined by R12, typically 182 kΩ, and R13, typically 130 kΩ is 7.2 volts.

Figure 4:
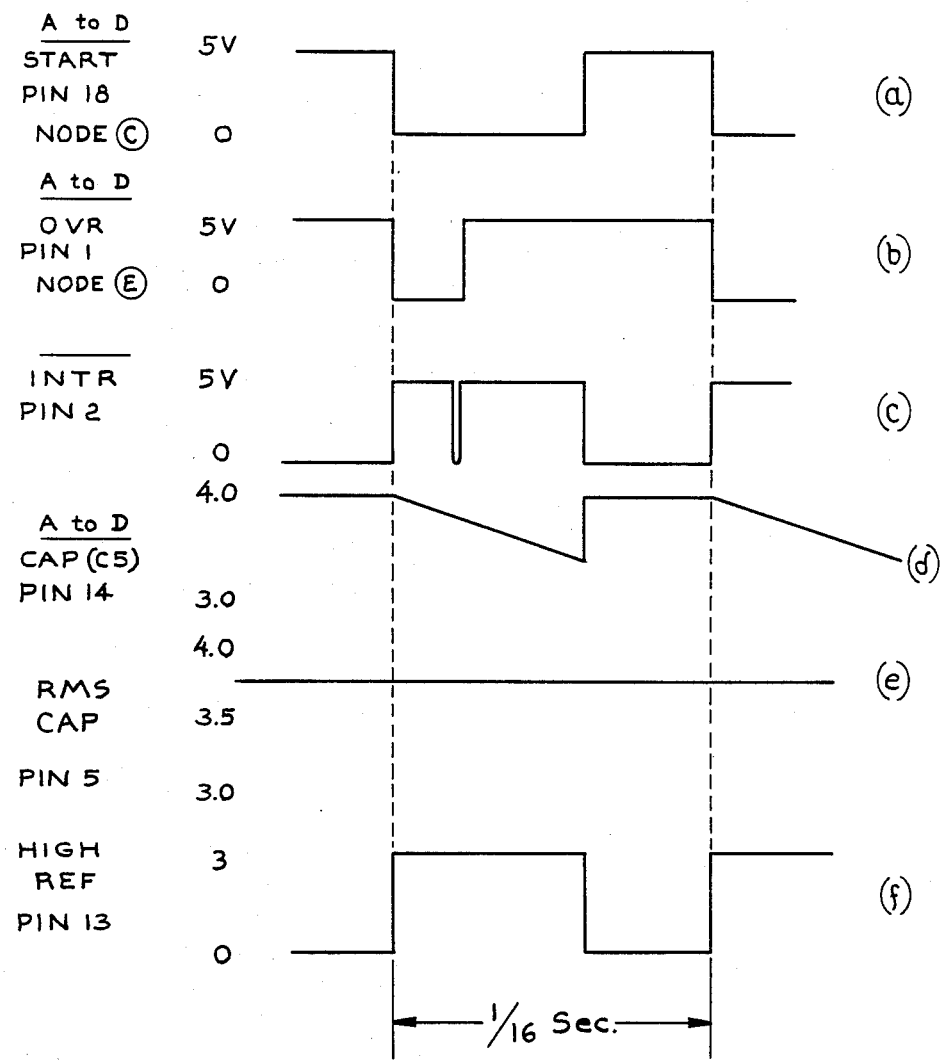
FIG. 4 shows the timing diagram of a single cycle of the analog to digital time signal converter used in the audio dosimeter.

FIG. 4 gives a timing diagram of a single cycle used in the analog to digital converter. In the following discussion, reference is made to points and components of FIG. 3. At the start of the cycle A to D START node Ⓒ has been held high by the microcomputer which has forced C5 (FIG. 3) to charge to the upper limit—See FIG. 4(d). To initiate a conversion cycle, the microcomputer lowers both A to D START Node Ⓒ and A to D OVERRIDE Node Ⓔ. This action enables the gated 9.7 μA current sink as set by R10 typically 475 kΩ resistor (FIG. 3) in parallel with the 1.6 μA current sink at the emitter of Q4 (FIG. 3) and simultaneously selects the low reference current by disabling the open collector inverter INV1 associated with pin 13—See FIG. 4(f). The voltage across C5 (FIG. 3) linearly ramps to the low limit voltage established at the emitter of Q5—See FIG. 4(d). When the ramp voltage falls below the voltage of C4 as sensed by comparator CMP1 the interrupt, Node Ⓓ, pin 2, to the microcomputer is forced low as shown by FIG. 4(c). The microcomputer measures and stores the time interval from the start of the cycle to the falling edge of the interrupt signal at Node Ⓓ, and then clears the interrupt by raising A to D OVERRIDE Node F —See FIGS. 4(b) and (c). The interrupt pin will remain high until the CMP2 (FIG. 3) changes state when Node Ⓛ (FIG. 3) goes below the low limit voltage established at the emitter of Q5 (FIG. 3). On this interrupt the microcomputer measures and stores the total ramp time. The input sound pressure level is then computed as $$P_{in}(dB) = \left(\frac{T_R - T_D}{T_R}\right) R + P_{low}(DB), \quad \text{(Eq. 4)}$$

where $T_R$ is the total ramp time and $T_D$ is the time from start of ramp to the first interrupt, R is the range of the ramp in DB and $P_{low}$ is the power level associated with the low limit of the ramp. The actual ramp time as determined by the current sources and the value of C5 (FIG. 3) is not critical since the microcomputer calculates the input level based on the ratio of two time intervals. The nominal value of ramp time was selected to give a minimum of 256 counts such that a 64 dB range can be measured to a resolution of 0.25 dB.

The NOR gates 1 and 2 (FIG. 3) associated with $\overline{INTR}$ Node Ⓓ and A to D OVERRIDE Node Ⓔ allow the microcomputer to operate on signal levels at the input Node Ⓐ beyond the limits of the ramp. The presence of an immediate interrupt at the start of the ramp indicates that the signal level is above the upper limit of the ramp. If the signal level is below the range of the ramp raising, the A to D override will not clear the interrupt. Since no other interrupt occured the signal level must be below the lower limit of the ramp.

Figure 5:
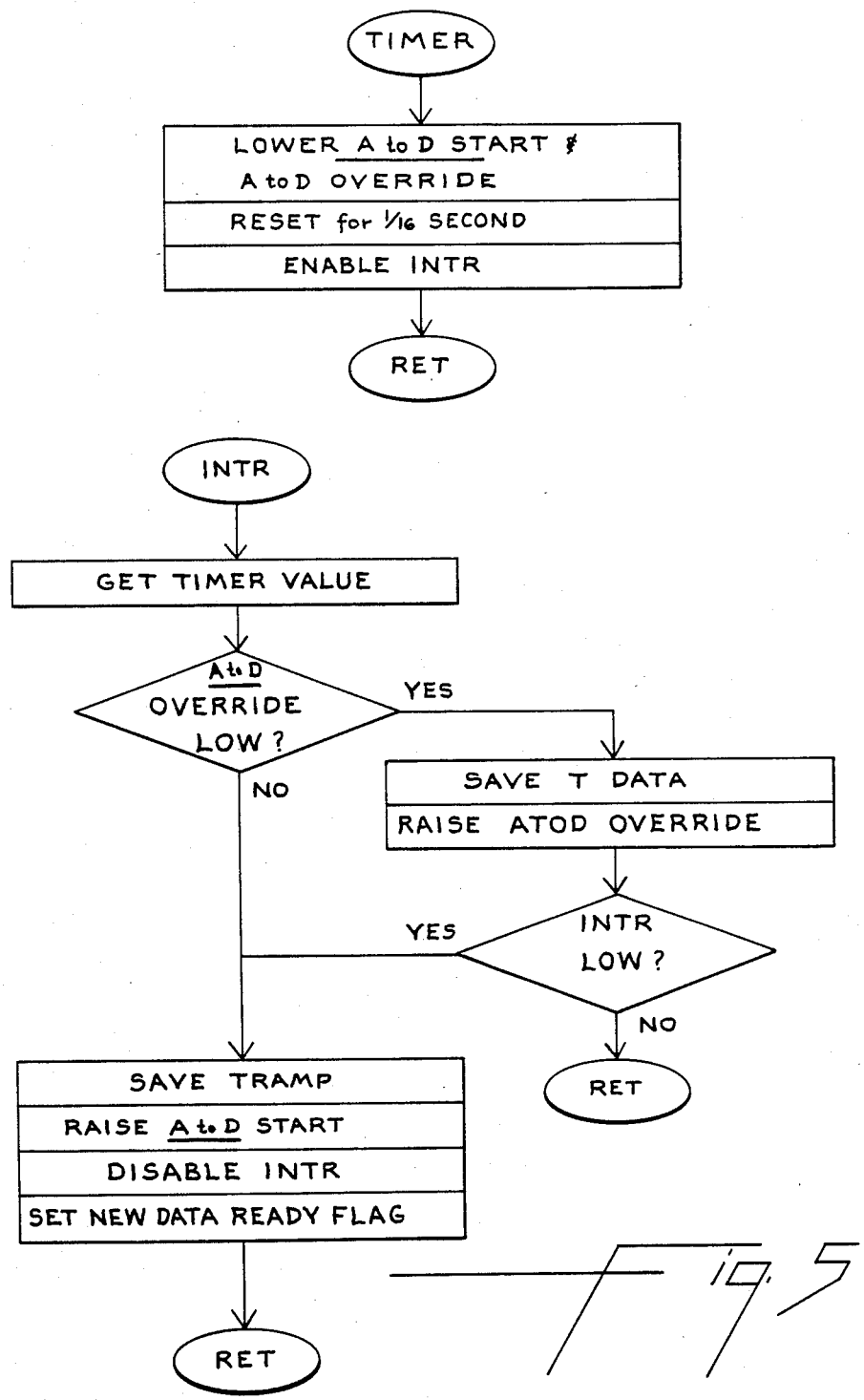
FIG. 5 shows a flow diagram of the timer and interrupt routines used in the audio dosimeter.

FIG. 5 shows a flow diagram of the timer and interrupt routines. In the timer routine a 1/16 second time base is established, the analog to digital conversion is started and the interrupts enabled. When an interrupt occurs, the microcomputer gets the timer count value and then tests the state of A to D OVERRIDE Node Ⓔ. If this output is low, then this is the first interrupt and the timer count value corresponds to a data crossing. The A to D OVERRIDE Node Ⓔ is then raised and the count saved. The state of the interrupt input Node Ⓓ is then tested. If the interrupt input is high, then a return is executed to wait for the end-of-ramp; but if the interrupt is low, then the input level is equal to or below the end-of-ramp limit. If on entry of the interrupt routine the A to D OVERRIDE Node Ⓔ is high, then a data sample has already been taken, and the total timer count value is then saved as the total ramp time value. To prepare for the next cycle, interrupts are disabled and A to D START Node Ⓒ is set high to charge C5 at Node Ⓛ to the upper limit voltage prior to execution of the return.

The primary function of the dosimeter is to compute dose based on the equation, $$D = \frac{100}{T_C} \int_0^T \text{antilog}_{10}[(L - L_c)/q]dt \text{ for } L > L_{co}, \quad \text{(Eq. 5)}$$

where D is dose, $T_c$ is the criterion time (8 hours) L is the input level in dBA, $L_c$ is the criterion level (typically 90 dBA), $L_{co}$ is the cutoff level (typically 80 dBA), and q is a factor determined from the doubling rate. The quantity q is defined as $$q = D_r/\log_{10}(2) \quad \text{(Eq. 6)}$$

where $D_r$ is the doubling rate in dB.

In the processor the calculations are performed using base 2 logarithms and the integration is performed numerically. Every 1/16 second a new dose value is computed based on the equation $$D = D + K*2((L - L_c)/D_r) \text{ for } L \geq L_{co} \quad \text{(Eq. 7)}$$

The parameters above are:
D—dose in binary % of dose.
L—input level in binary dB (64 dB range to 0.25 dB).
$L_C$—the criterion level in binary dB.
$D_r$—doubling rate in binary dB.
$L_{co}$—cutoff level in binary dB.
K—binary constant to normalize dose for desired output range and 1/16 second sample time.

To facilitate the calculations, a binary log look up table is used throughout to allow multiplication and division to be performed using addition and subtraction. The log of a binary number is represented by a mantissa and an exponent. The mantissa is derived from the 9 most significant bits of the binary number to be logged. The exponent is a binary number representing the number of bit shifts required to normalize the number. The antilog process results in a multibyte number with a significance of 9 bits shifted right or left by the value of the exponent. A left bit shift is equivalent to multiplying by powers of 2. The 9-bit significance is sufficient to express a number to an accuracy of 0.4%.

Figure 6:
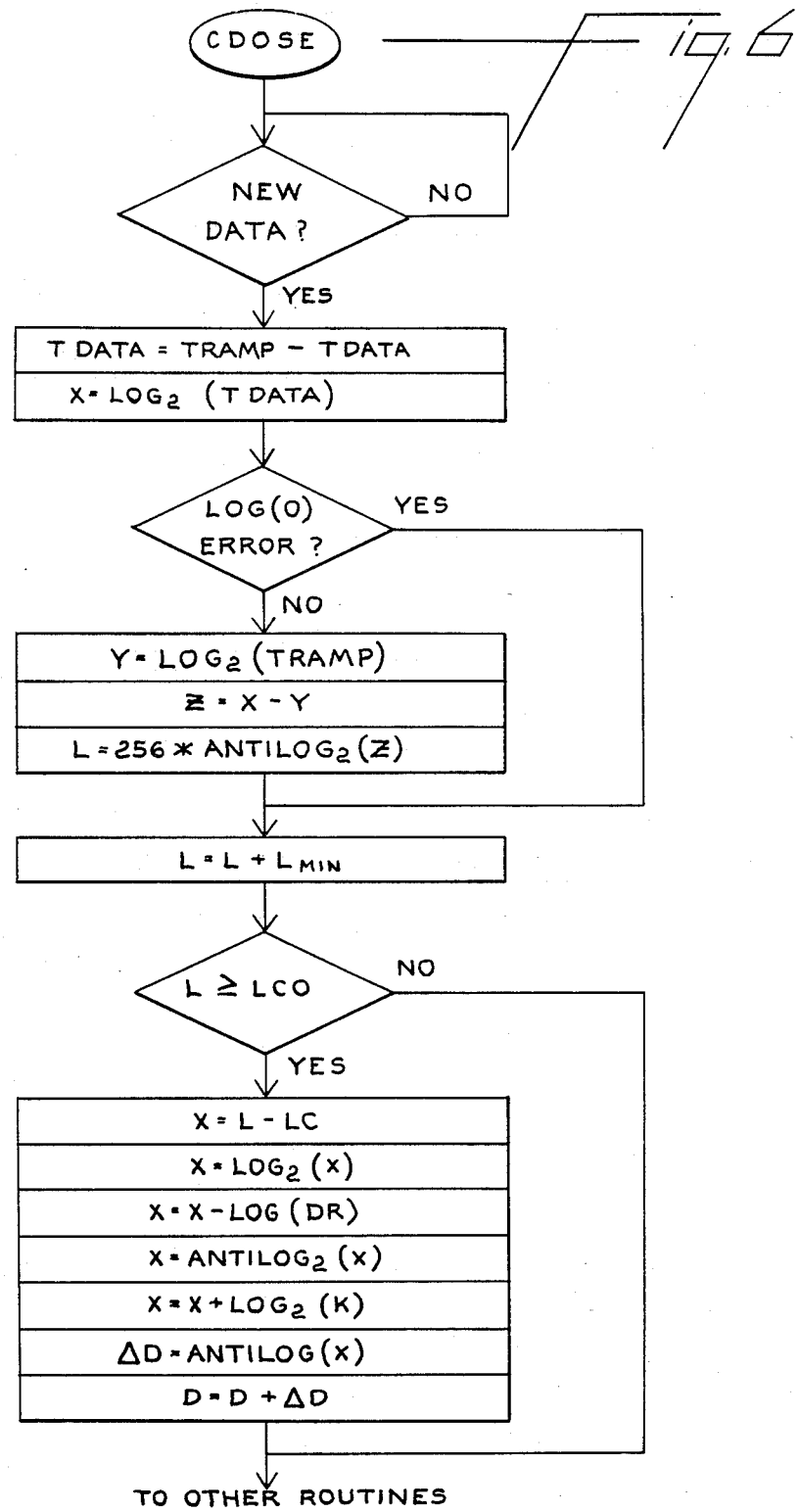
FIG. 6 shows a simplified flow diagram used to compute dose from the ramp timing data.

FIG. 6 is a simplified flow diagram used to compute dose from the ramp timing data derived in FIG. 5. When end-of-ramp occurs a flag bit is set to indicate that new data is ready for processing. In the main routine the changing of state of this bit indicates the start of a new dose increment calculation. TDATA is the time from start-of-ramp to data crossing. The first step in processing recalculates TDATA by substracting TDATA from TRAMP to reference the calculation to the lower limit of the system (See Eq. 4). The value of L in binary dB (see Eq. 7) is computed by first taking the log of TDATA. The logging subroutine generates an error flag if TDATA is zero. If TDATA is zero, the level is assumed to be the lower limit of the ramp; but if it is not, then the ratio of TDATA to TRAMP (See Eq. 4) is taken by substracting the log of TRAMP from the log of TDATA. This quantity is then antilogged and multiplied by 256. This results in an 8-bit binary representation of L to 0.25 dB as reference to that lower limit of the ramp.

The absolute value of L is then computed by adding L to LMIN. LMIN is a constant determined by the settings of the gain switches (FIG. 2, 19). The value of L is then compared with the cutoff level, $L_{co}$. If L is less than $L_{co}$, then the dose calculation is bypassed. Otherwise, an intermediate value, X, is calculated by subtracting the criterion level, $L_c$, and then taking the log of X. This quantity is divided by the doubling rate, $D_r$, by subtracting $\log_2(D_r)$ and taking the antilog. The dose increment $\Delta D$ for this time interval is computed by summing the $\log_2(K)$ to the value just computed and taking the antilog. The dose accumulator is then updated by adding in the new value $\Delta D$. The constants $L_c$, $L_{co}$ and $D_r$ are stored in the program and are selected by parameter switch (See FIG. 2, 20).

The constant K has a specific value which was selected to make the 24th bit of a 6 byte wide dose accumulator correspond to 0.1% of dose. Internal to the microcomputer it is possible to accumulate a dose of up to $1.68 \times 10^6\%$ of dose with the smallest increment of dose being $0.6 \times 10^{-9}\%$ of dose. This technique of computation results in extremely wide dynamic range integration of dose whereby small values of dose increments can be accumulated to large dose values without loss of significance.

Using similar techniques, the microcomputer calculates:

LAVG: The sound pressure level which would give the dose accumulated in run time.

SPL: A calculation of the average sound pressure level for one second.

LMAX: The highest SPL recorded by the dosimeter.

In addition, the microcomputer maintains a running time clock, formats data to the LCD display, reads the parameter switch (FIG. 2, 20) and monitors the optional external computer data interface.

Another aspect of this invention is a circuit which is a true x-squared detector circuit which can be used as a perfect RMS detector which receives an input signal and determines the x-squared value of the signal. This circuit has the following components:

(a) an x-squared detector circuit which receives the input signal and generates a voltage signal which is proportional to the log of the square of the input signal;

(b) temperature compensation circuit electrically connected to the x-squared detector circuit which develops a reference signal through ramping and integrating means matched to the x-squared detector thereby temperature compensating the voltage signal of the x-squared detector circuit;

(c) analog to digital time converter circuit electrically attached to the temperature compensation circuit which converts the temperature compensated logging voltage signal to digital time signal;

(d) a microcomputer electrically connected to the temperature compensation circuit and controls the integrating and ramping functions of the circuit and electrically connected to the analog to digital time converter and controls the functions of the converter and receives the digital time signal from the converter and having a calculating means for converting the time signal into x-squared value of the input signal.

We claim:

1. An audio dosimeter for measuring exposure to sound comprising:

(a) an electronic microphonic sound sensor means which generates electric input signal upon activation by sound;

(b) an amplifier and weighting circuit electrically connected to the sound sensor means which amplifies the input signal from the sound sensor means and provides an "A" weighted signal directly related to the frequency of the sound which activated the sound sensor;

(c) an x-squared detector circuit electrically connected to the amplifier and weighting circuit which receives the input signal and generates a voltage signal which is proportional to the log of the square of the input signal;

(d) temperature compensation circuit electrically connected to the x-squared detector circuit which develops reference signals through ramping and intergrating means matched to the x-squared detector circuit and thereby temperature compensating the voltage signal of the x-squared detector circuit;

(e) analog to digital time converter circuit electrically attached to the temperature compensation circuit which converts the temperature compensated voltage signal to digital time signal;

(f) a microcomputer electrically connected to the temperature compensation circuit and controls the integrating and ramping functions of the circuit and electrically connected to the analog to digital time converter and controls the functions of the converter and receives the digital time signals from the converter and having a calculating means for converting the time signals into sound measurement values.

2. The audio dosimeter of claim 1 having a gain circuit electrically connected to the amplifier and weighting circuit and microcomputer which allows selection of additional amplifier gain for audio range.

3. The audio dosimeter of claim 2 having a parameter switch electrically connected to the microcomputer for selection of doubling rates, threshold levels and criterion levels.

4. The audio dosimeter of claim 1 in which the x-squared detector circuit comprises a bilateral logging circuit, a bilateral antilogging and integrating circuit wherein the input signal is converted to a bilateral current signal and develops a voltage which is proportional to two times the log of the input signal and is fed into the bilateral antilogging and integrating circuit producing a voltage which is proportional to the log of the square of the input signal.

5. The audio dosimeter of claim 1 in which the temperature compensation circuit having constant current source and a capacitor connected in parallel comprises:

(a) a logging voltage to current converter, and a first antilogging converter feeding the constant current source thereby generating a low reference signal;

(b) a second antilogging converter feeding the parallel connected capacitor and constant current source thereby generating a first ramping reference signal; wherein both the low reference signal and the ramping reference signal being compensated for temperature and where the circuit produces a momentary high reference signal across the capacitor upon a command from the microcomputer to start the ramping reference signal ramping down;

(c) a first comparator which receives the low reference signal and the ramping reference signals and detects end-of-ramp;

(d) a second comparator which receives the signals of (c) above and the input signal from the x-squared detector and determines when the ramping signals intersect the input signal;

wherein a signal from the first or second comparator fed to the logic circuit of the microcomputer pulls down the interrupt line of the microcomputer and the microcomputer which controls ramping functions ratios time intervals in the ramping functions and detects sound pressure levels in decibels.

6. The audio dosimeter of claim 1 having a display electrically connected to the computer to visually show sound measurement values determined by the microcomputer.

7. The audio dosimeter of claim 6 in which the microcomputer has a program for calculating values of percentage dose, average decibel level of exposure, maximum decibel level of exposure, instantaneous sound level and time of exposure.

8. The audio dosimeter of claim 7 containing a selector switch which allows for the display of the individual values and allows the dosimeter to be used as a sound level meter by display of instantaneous sound level.

9. The audio dosimeter of claim 1 having a control, interface connected to the microcomputer for sending data to a second computer.

10. A true x-squared detector circuit which receives an input signal and determines the x-squared value of the signal; wherein the circuit comprises:
   (a) an x-squared detector circuit which receives the input signal and generates a voltage signal which is proportional to the log of the square of the input signal;
   (b) temperature compensation circuit electrically connected to the x-squared detector circuit which develops a reference signal through ramping and integrating means matched to the x-squared detector thereby temperature compensating the voltage signal of the x-squared detector circuit;
   (c) analog to digital time converter circuit electrically attached to the temperature compensation circuit which converts the temperature compensated logging voltage signal to digital time signal;
   (d) a microcomputer electrically connected to the temperature compensation circuit and controls the integrating and ramping functions of the circuit and electrically connected to the analog to digital time converter and controls the functions of the converter and receives the digital time signal from the converter and having a calculating means for converting the time signal into x-squared value of the input signal.

* * * * *